United States Patent
Gove et al.

(10) Patent No.: US 9,030,583 B2
(45) Date of Patent: May 12, 2015

(54) IMAGING SYSTEM WITH FOVEATED IMAGING CAPABILITES

(75) Inventors: Robert Gove, Los Gatos, CA (US); Kenneth Edward Salsman, Pleasanton, CA (US)

(73) Assignee: Semiconductor Components Industries, LLC, Phoenix, AZ (US)

( * ) Notice: Subject to any disclaimer, the term of this patent is extended or adjusted under 35 U.S.C. 154(b) by 329 days.

(21) Appl. No.: 13/531,444

(22) Filed: Jun. 22, 2012

(65) Prior Publication Data

US 2013/0070109 A1    Mar. 21, 2013

Related U.S. Application Data

(60) Provisional application No. 61/537,340, filed on Sep. 21, 2011.

(51) Int. Cl.
*H04N 5/335* (2011.01)
*H04N 5/347* (2011.01)
*H04N 5/369* (2011.01)

(52) U.S. Cl.
CPC .............. *H04N 5/347* (2013.01); *H04N 5/3696* (2013.01)

(58) Field of Classification Search
CPC ....................................................... H04N 5/347
USPC ...................................... 348/207.1, 299, 302
See application file for complete search history.

(56) References Cited

U.S. PATENT DOCUMENTS

| | | | |
|---|---|---|---|
| 6,252,989 B1 | 6/2001 | Geisler et al. | |
| 6,320,618 B1 | 11/2001 | Aoyama | |
| 6,455,831 B1 | 9/2002 | Bandera et al. | |
| 7,872,635 B2 | 1/2011 | Mitchell | |
| 2004/0061787 A1 | 4/2004 | Liu et al. | |
| 2004/0095492 A1* | 5/2004 | Baxter et al. | 250/208.1 |
| 2005/0012968 A1* | 1/2005 | McCaffrey | 358/482 |
| 2005/0117015 A1 | 6/2005 | Cutler | |
| 2008/0143857 A1 | 6/2008 | Shimizu et al. | |
| 2009/0080695 A1 | 3/2009 | Yang | |
| 2011/0013040 A1 | 1/2011 | Han et al. | |

FOREIGN PATENT DOCUMENTS

EP         2023611         2/2009

* cited by examiner

*Primary Examiner* — Usman Khan
(74) *Attorney, Agent, or Firm* — Treyz Law Group; Kendall P. Woodruff

(57) ABSTRACT

An electronic device may have a camera module. The camera module may include a camera sensor capable of capturing foveated images. The camera sensor may be hardwired to capture foveated images with fixed regions of different quality levels or may be dynamically-reconfigurable to capture foveated images with selected regions of different quality levels. As one example, the camera module may be hardwired to capture a center region of an image at full resolution and peripheral regions at reduced resolutions, so that a user can merely center objects of interest in the image to capture a foveated image. As another example, the camera module may analyze previous images to identify objects of interest and may then reconfigure itself to capture the identified objects of interest at a high quality level, while capturing other regions at reduced quality levels.

18 Claims, 6 Drawing Sheets

IMAGING SYSTEM WITH FOVEATED IMAGING CAPABILITES

This application claims the benefit of provisional patent application No. 61/537,340, filed Sep. 21, 2011, which is hereby incorporated by reference herein in its entirety.

BACKGROUND

The present invention relates to imaging systems and, more particularly, to imaging systems with foveated imaging capabilities.

Electronic devices such as cellular telephones, camera, and computers often use digital camera modules to capture images. Typically, digital camera modules capture an image with a constant resolution, or level of detail, across the image. In contrast, the human eye utilizes a variable resolution (e.g., foveation) to capture its field of view such that the center of the field of view is captured at relatively high resolutions and the peripheral regions of the field of view are captures at relatively lower resolutions. At because of these difference, digital camera modules that capture images with a constant resolution across the image are not ideal for capturing images with regions of relatively high interest to a viewer and regions of relatively low interest to the viewer. The images captured by the digital camera modules will consume excessive space and will not enhance the appearance of regions of high interest, as the human eye does.

DETAILED DESCRIPTION

Figure 1:
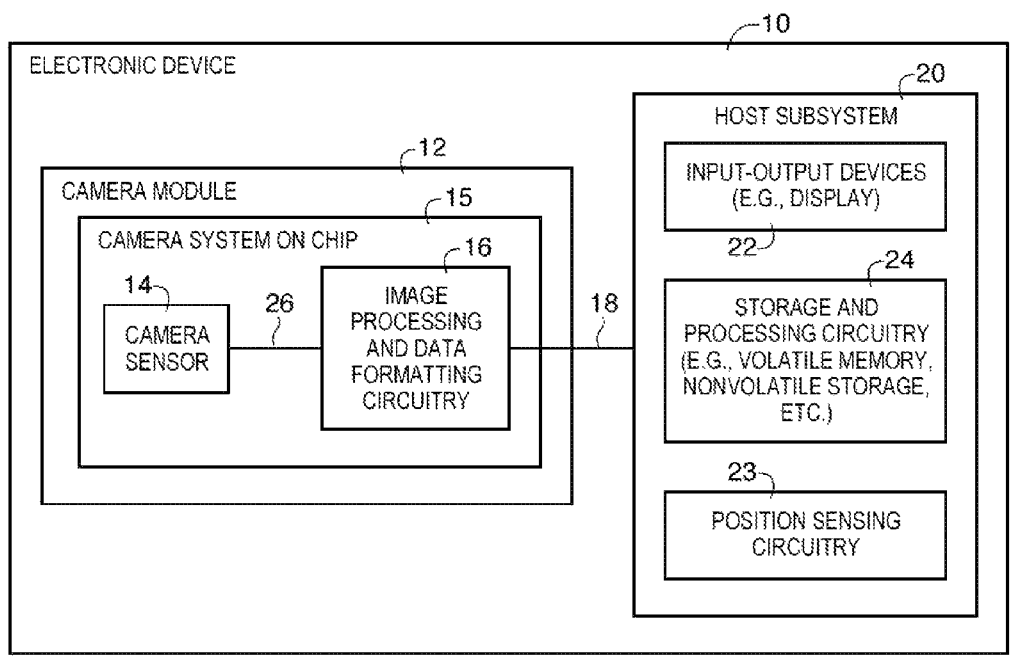
FIG. 1 is a diagram of an illustrative electronic device that may include a camera module that captures foveated images and a host subsystem coupled to the camera module in accordance with an embodiment of the present invention.

Digital camera modules are widely used in electronic devices. An electronic device with a digital camera module is shown in FIG. 1. Electronic device 10 may be a digital camera, a computer, a cellular telephone, or other electronic device. Imaging system 12 (e.g., camera module 12) may include an image sensor 14 and a lens. During operation, the lens focuses light onto image sensor 14. The pixels in image sensor 14 include photosensitive elements that convert the light into digital data. Image sensors may have any number of pixels (e.g., hundreds or thousands or more). A typical image sensor may, for example, have millions of pixels (e.g., megapixels). In high-end equipment, sensors with 10 megapixels or more are not uncommon.

Still and video image data from camera sensor 14 may be provided to image processing and data formatting circuitry 16 via path 26. Image processing and data formatting circuitry 16 may be used to perform image processing functions such as adjusting white balance and exposure and implementing video image stabilization, image cropping, image scaling, etc. Image processing and data formatting circuitry 16 may also be used to compress raw camera image files if desired (e.g., to Joint Photographic Experts Group or JPEG format).

If desired, camera sensor 14 may be used to capture foveated images. As one example, camera sensor 14 may be hardwired to provide foveation (e.g., camera sensor 14 may be hardwired to capture images with relatively high resolutions in a first region, such as a center region, relatively low resolutions in a second region, such as peripheral regions, and, if desired, any number intermediate resolutions in additional regions. As another example, camera sensor 14 may be dynamically adjusted to provide foveation and, if desired, may be able to capture non-foveated images. In particular, camera sensor 14 may be able to be dynamically-reconfigured to capture different regions with different levels of resolution (e.g., in a first image, at least first and second regions may be captured with at least first and second resolutions, respectively, while in a second image, different regions are captured with similar or even other resolutions).

In a typical arrangement, which is sometimes referred to as a system on chip or SOC arrangement, camera sensor 14 and image processing and data formatting circuitry 16 are implemented on a common integrated circuit 15. The use of a single integrated circuit to implement camera sensor 14 and image processing and data formatting circuitry 16 can help to minimize costs. If desired, however, multiple integrated circuits may be used to implement circuitry 15.

Circuitry 15 conveys data to host subsystem 20 over path 18. Circuitry 15 may provide acquired image data such as captured video and still digital images to host subsystem 20.

Electronic device 10 typically provides a user with numerous high level functions. In a computer or advanced cellular telephone, for example, a user may be provided with the ability to run user applications. To implement these functions, electronic device 10 may have input-output devices 22 such as projectors, keypads, input-output ports, and displays and storage and processing circuitry 24. Storage and processing circuitry 24 may include volatile and nonvolatile memory (e.g., random-access memory, flash memory, hard drives, solid state drives, etc.). Storage and processing circuitry 24 may also include processors such as microprocessors, microcontrollers, digital signal processors, application specific integrated circuits, etc.

Device 10 may include position sensing circuitry 23. Position sensing circuitry 23 may include, as examples, global positioning system (GPS) circuitry and radio-frequency-based positioning circuitry (e.g., cellular-telephone positioning circuitry).

Figure 2:
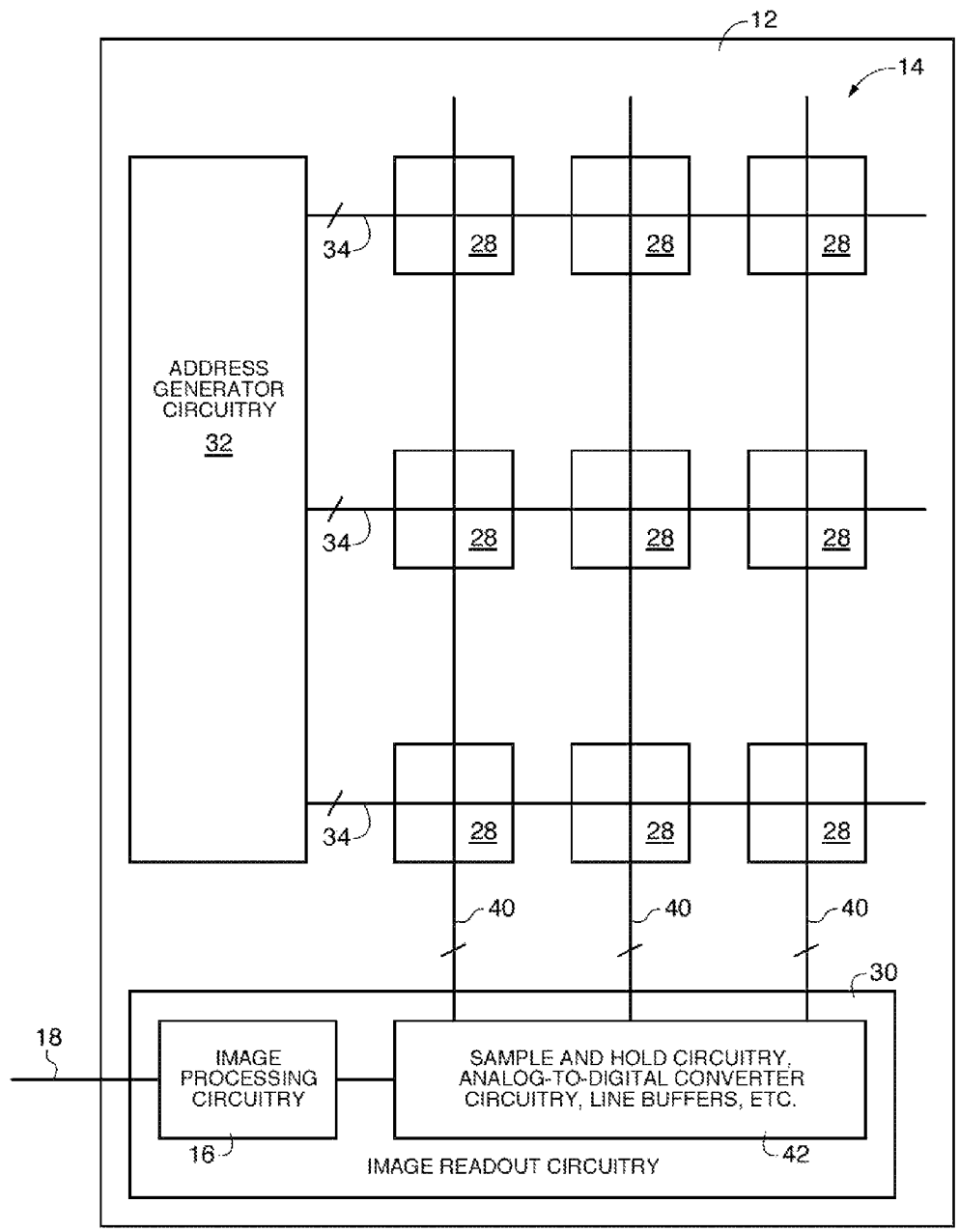
FIG. 2 is a diagram of an illustrative array of light-sensitive imaging pixels and control circuitry coupled to the array of pixels that may form a camera sensor in a camera module such as the camera module of FIG. 1 in accordance with an embodiment of the present invention.

An example of an arrangement for sensor array 14 is shown in FIG. 2. As shown in FIG. 2, device 10 may include an array 14 of pixels 28 coupled to image readout circuitry 30 and address generator circuitry 32. As an example, each of the pixels in a row of array 14 may be coupled to address generator circuitry 32 by one or more conductive lines 34. Array 14 may have any number of rows and columns. In general, the size of array 14 and the number of rows and columns in array 14 will depend on the particular implementation. While rows and columns are generally described herein as being horizontal and vertical, rows and columns may refer to any grid-like structure (e.g., features described herein as rows may be arranged vertically and features described herein as columns may be arranged horizontally).

Address generator circuitry 32 may generate signals on paths 34 as desired. For example, address generator circuitry 32 may generate reset signals on reset lines in paths 34, transfer signals on transfer lines in paths 34, and row select (e.g., row readout) signals on row select lines in paths 34 to control the operation of array 14. If desired, address generator circuitry 32 and array 14 may be integrated together in a single integrated circuit (as an example).

Signals 34, generated by address generator circuitry 32 as an example, may include signals that dynamically adjust the resolution of array 14. For example, signals 34 may include binning signals that cause pixels 28 in a first region of array 14 to be binned together (e.g., with a 2-pixel binning scheme, with a 3-pixel binning scheme, or with a pixel binning scheme of 4 or more pixels) and that cause pixels 28 in a second region of array 14 to either not be binned together or to be binned together to a lesser extent than the first region. In addition, signals 34 may cause pixels 28 in any number of additional (e.g., third, fourth, fifth, etc.) regions of array 14 to be binned together to any number of different, or identical, degrees (e.g., 2-pixel binning schemes, 3-or-more-pixel binning schemes, etc.).

Array 14 may be used to capture foveated images with dynamically-selected high resolution, low resolution, and any number of intermediate resolution regions (corresponding to regions of array 14). For example, in a first foveated image, a center region of array 14 may be dynamically-configured to capture the center region of the image at high resolution while peripheral regions of array 14 may be dynamically-configured to capture the peripheral regions of the image at low resolution. Following the previous example, in a second foveated image, an upper region of array 14 (perhaps, as an example, a region in which an object of interest has been detected) may be dynamically-configured to capture the upper region of the image at high resolution while other regions of array 14 may be dynamically-configured to capture those regions of the image at low resolution.

With one suitable arrangement, circuitry 32 may provide signals 34 that dynamically-configure each region of array 14 to operate at an individual resolution, which may be shared with any number of the other regions of array 14. To configure a region of array 14 to capture image data at a relatively high resolution, circuitry 32 may provide signals 34 that disable pixel binning within that region of array 14. In contrast, to configure a region of array 14 to capture image data at moderate or low resolutions, circuitry 32 may provide signals 34 that enable moderate pixel binning, for moderate resolutions, or aggressive pixel binning, for low resolutions, within that region of array 14.

Image readout circuitry 30 may include circuitry 42 and image processing and data formatting circuitry 16. Circuitry 42 may include sample and hold circuitry, analog-to-digital converter circuitry, and line buffer circuitry (as examples). As one example, circuitry 42 may be used to measure signals in pixels 28 and may be used to buffer the signals while analog-to-digital converters in circuitry 42 convert the signals to digital signals. In a typical arrangement, circuitry 42 reads signals from rows of pixels 28 one row at a time over lines 40. With another suitable arrangement, circuitry 42 reads signals from groups of pixels 28 (e.g., groups formed from pixels located in multiple rows and columns of array 14) one group at a time over lines 40. The digital signals read out by circuitry 42 may be representative of charges accumulated by pixels 28 in response to incident light. The digital signals produced by the analog-to-digital converters of circuitry 42 may be conveyed to image processing and data formatting circuitry 16 and then to host subsystem 20 (FIG. 1) over path 18.

Figure 3:
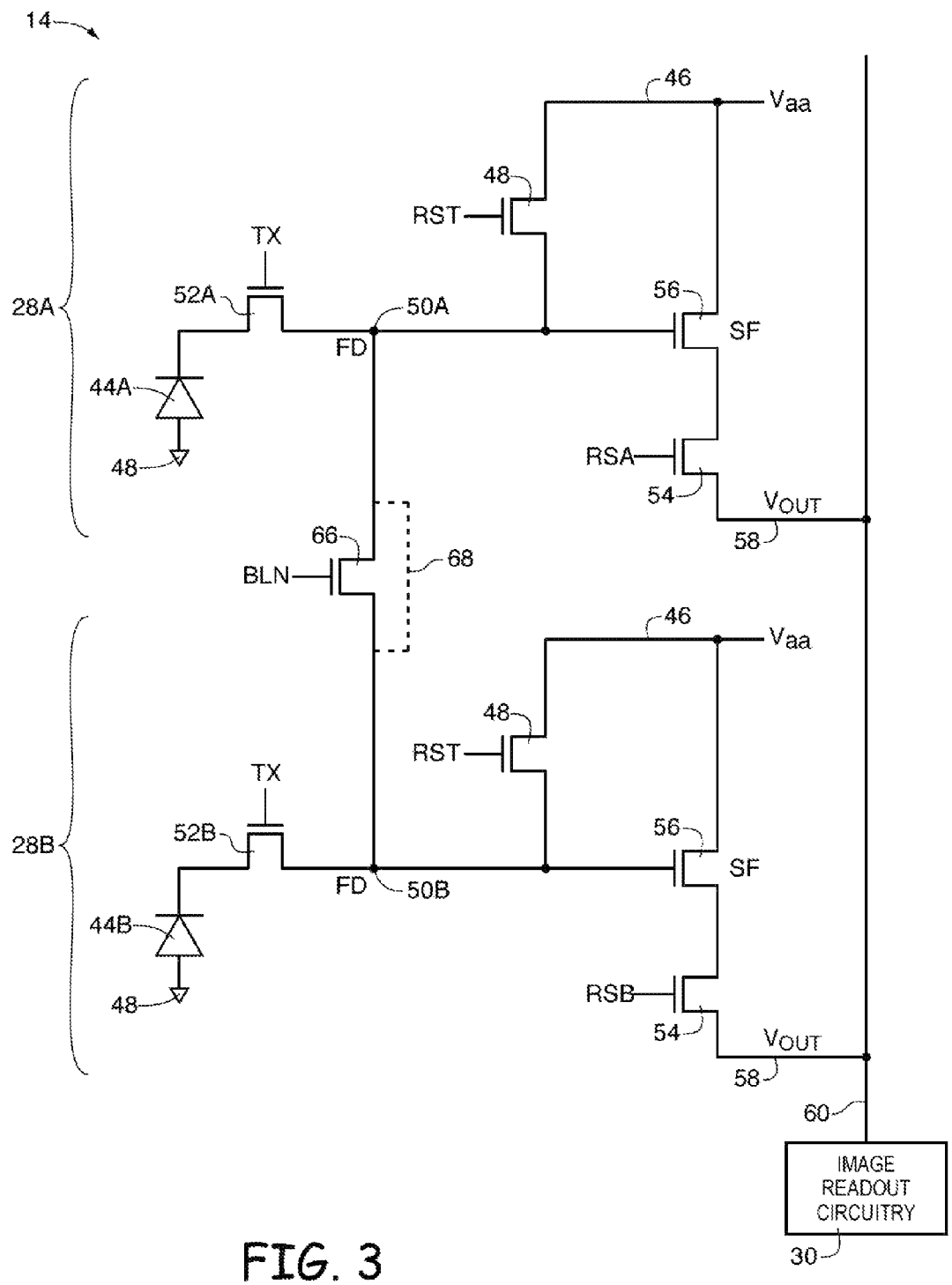
FIG. 3 is a diagram of an illustrative pair of imaging pixels that may be binned together as part of capturing foveated images in accordance with an embodiment of the present invention.

Circuitry in an illustrative pair of pixels 28 in sensor 14 is shown in FIG. 3. As shown in FIG. 3, pixels 28A and 28B include photosensitive elements such as photodiodes 44. With one suitable arrangement, pixels 28A and 28B may be in separate and adjacent rows of array 14. A positive power supply voltage (e.g., voltage Vaa) may be supplied at one or more positive power supply terminals 46. A ground power supply voltage (e.g., Vss) may be supplied at one or more ground terminals 48. Incoming light may be collected by photosensitive elements such as photodiodes 44 after passing through a color filter structure (not shown in FIG. 3). Photodiodes 44 convert the light to electrical charges.

Before an image is acquired, reset control signals RST may be asserted. The reset control signals turn on reset transistors 48 and reset charge storage nodes 50 (also referred to as floating diffusions FD) to Vaa. The reset control signals RST may then be deasserted to turn off reset transistors 48. After the reset process is complete, transfer gate control signals TX may be asserted to turn on transfer transistors (transfer gates) 52. When transfer transistors 52 are turned on, the charges that have been generated by photodiodes 44 in response to incoming light are transferred to respective charge storage nodes 50. Charge storage nodes 50 may be implemented using regions of doped semiconductor (e.g., doped silicon regions formed in a silicon substrate by ion implantation, impurity diffusion, or other doping techniques). The doped semiconductor regions (i.e., the floating diffusions FD) each exhibit a capacitance that can be used to store the charge that has been transferred from the respective photodiode 44. The signal associated with the stored charges on nodes 44 are conveyed to respective row select transistors 54 by respective source-follower transistors 56.

When it is desired to read out the values of the stored charges (i.e., the values of the stored charges that are represented by the signals at the sources S of transistors 56), an appropriate row select control signal RS can be asserted (e.g., when reading out pixel 28A, row select signal RSA can be asserted and, when reading out pixel 28B, row select signal RSB can be asserted). When a row select signal RS is asserted, the respective transistor 54 turns on and a corresponding signal Vout that is representative of the magnitude of the charge on the charge storage node 50 is produced on output path 58. In a typical configuration, there are numerous rows and columns of pixels such as pixels 28 in array 14. When a row select signal RS is asserted in a given row, a path such as path 60 can be used to route signal Vout from that a pixel in that row to readout circuitry such as image readout circuitry 30.

Image readout circuitry 30 that is coupled to pixels 28 along column lines 40 may include readout circuitry such as sample and hold circuitry for reading out image signals from pixels 28 and column bias circuitry for providing column bias currents to, for example, source follower transistors 56 of pixels 28 along that column line.

As shown in FIG. 3, two or more pixels such as pixels 28A and 28B may be binned together. Pixel binning may be used, as examples, to increase signal-to-noise ratios (e.g., when imaging relatively dark scenes and/or when capturing images using relatively short exposure times such as in high speed imaging operations), to decrease image resolutions, and to increase imaging speeds. In the example of FIG. 3, two pixels 28A and 28B may be binned together using a transistor such as binning transistor 66. As one example, binning control signals BIN may be asserted while transfer transistors 52A and 52B are asserted (e.g., either simultaneously or sequentially) such that the accumulated charges from photodiodes 44A and 44B are transferred onto floating diffusion node 50B (or, alternatively, node 50A). With this type of arrangement, the effective resolution of array 14 may be reduced (e.g., by half, if every pixel 28 in array 14 was part of a respective pair of binned pixels). In addition, because of the reduced resolution of array 14, it may be possible to read out array 14 at higher speeds. In particular, as there may be a smaller number, in binned arrangements, of floating diffusion nodes 50 that need to read out from array 14, image readout operations may take less time than when array 14 is operating at its maximum (i.e., native) resolution.

With the arrangement shown in FIG. 3, array 14 may be dynamically-reconfigurable to operate with or without pixel binning depending on whether binning control signals BIN are utilized. If desired, array 14 may be operated with some regions that are binned and other regions that are not binned (e.g., that are operated at their native resolution).

With another suitable arrangement, some or all of array 14 may be hard-wired with pixel binning. For example, some regions of array 14 may be hard-wired to operate relatively lower resolutions than other regions of array 14. In regions of array 14 hard-wired with pixel binning, binning transistors 66 in those regions may be replaced with hard-wired paths 68 that short together two or more floating diffusion regions. Moreover, in such arrangement duplicative circuits may be omitted. In the FIG. 3 example, reset transistor 48, source-follower transistor 56, row-select transistor 54, and output path 58 of pixel 28A could be omitted, in arrangements in which the binned pixel pair formed from pixels 28A and 28A are read out through the output path 58 associated with pixel 28B.

If desired, some or all of pixels 28 of array 14 may be arranged in binning groups containing more than two pixels. As an example, array 14 may include binned pixel groups of three pixels, four pixels, or more than four pixels. With such arrangement, the effective resolution of array 14, or binned regions of array 14, may be further reduced.

Figure 4:
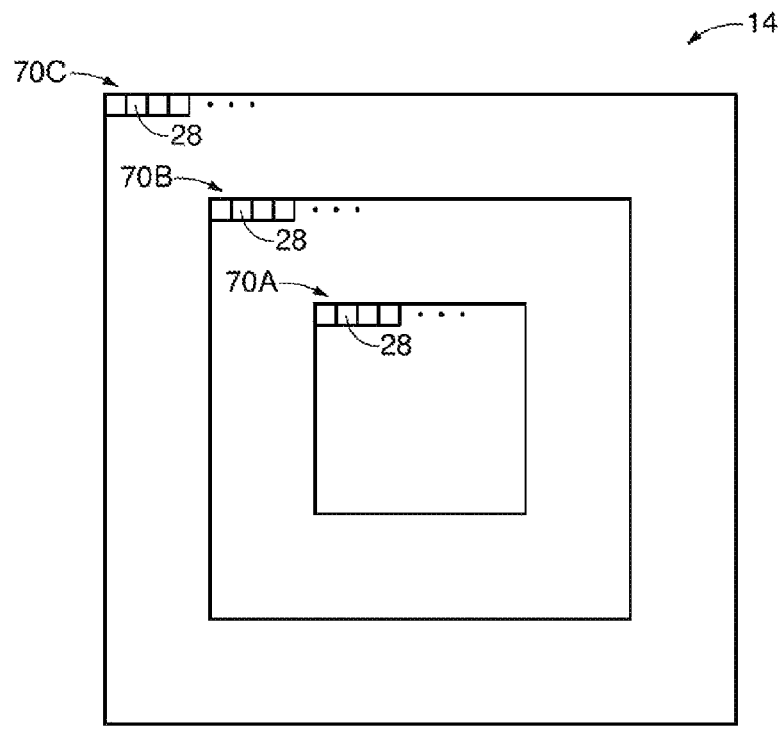
FIG. 4 is a diagram of an illustrative array of imaging pixels that may have fixed foveated regions and that may be operable to capture foveated images in accordance with an embodiment of the present invention.

With one suitable arrangement, array 14 may be hardwired with a fixed foveation pattern. For example, array 14 may include two or more regions that operate with different resolutions and/or different frame rates. FIG. 4 illustrates an arrangement in which array 14 includes three different regions. In general, array 14 may include any desired number of different regions.

As shown in FIG. 4, array 14 may include a center region 70A, an intermediate region 70B, and a peripheral region 70C. Center 70A may operate at a first resolution and a first frame rate, intermediate region 70B may operate at a second resolution and a second frame rate, and peripheral region 70C may operate at a third resolution and a third frame rate. With some suitable arrangements, the first resolution is greater than the second resolution and the second resolution is greater than the third resolution, while the first, second, and third frame rates are identical. With other suitable arrangements, the first frame rate is greater than the second frame rate and the second frame rate is greater than the third frame rate, while the first, second, and third resolutions are identical. With still other suitable arrangements, the first resolution is greater than the second resolution and the second resolution is greater than the third resolution, while the first frame rate is greater than the second frame rate and the second frame rate is greater than the third frame rate. These are merely illustrative examples.

Regions 70A, 70B, and 70C may be hardwired to operate at different resolutions and/or frame rates. In arrangements in which regions 70A, 70B, and 70C are hardwired to operate at different resolutions, regions 70A, 70B, and 70C may be fabricated with pixels 28 of different sizes and/or different spacings between the pixels (e.g., to provide different "native" resolutions). If desired, the pixels 28 of regions 70A, and 70B, and 70C may be fabricated in a uniform density across array 14, but may be hardwired with different binning patterns in regions 70A, 70B, and 70C. For example, the pixels 28 of region 70A may not be binned together, the pixels 28 of region 70B may be binned together in groups of two pixels, and the pixels 28 of region 70C may be binned together in groups of four pixels.

The array 14 illustrated in the FIG. 4 example may be operable to capture foveated images in which the center region of the image is captured with a high level of detail, intermediate regions are captured with a moderate level of detail, and peripheral regions are captured with relatively low level of detail. This type of arrangement may be useful in devices in which basic foveation capabilities are desired. For example, if array 14 were implemented in a handheld camera, a user of the camera could simply aim array 14 such that objects of interest were in the center region 70A of array 14, so that the resulting image captures the objects of interest with a high level of detail. Because of the reduced levels of details in regions 70B and 70C, the resulting foveated image may have a smaller file size than a corresponding full resolution image (e.g., an image in which peripheral regions were captured at the same high resolution as the center regions).

The arrangement of FIG. 4, in which regions 70A, 70B, and 70C are arranged in concentric rings, is merely illustrative. If desired, array 14 may include regions 70 in different shapes. As examples, regions 70 may be formed in circular rings (e.g., the borders between regions 70A and 70B and between regions 70B and 70C may be circular), region 70A may be offset from the center of array 14, regions 70A, 70B, and 70C may be arranged in horizontal or vertical bands (e.g., region 70A may occupy a right, or upper, third of array 14, region 70B may occupy a center third of array 14, and region 70C may occupy a left, or lower, third of array 14). Regions 70A, 70B, and 70C may not be contiguous, if desired. There may be any number of regions 70 in array 14. These are merely illustrative examples.

Figure 5:
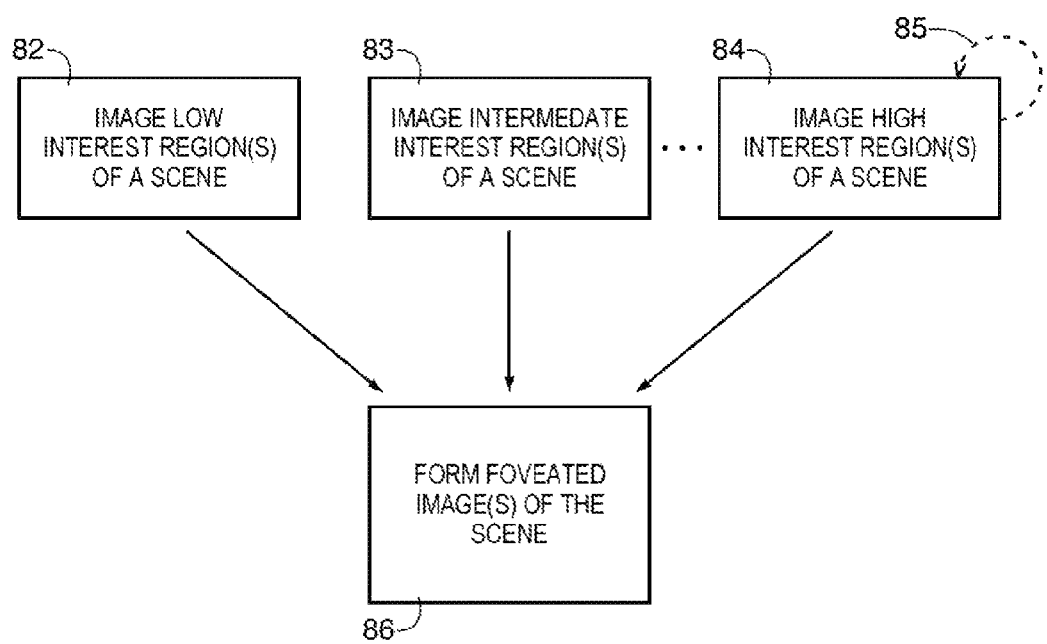
FIG. 5 is a flow chart of illustrative steps involved in using an imaging system to capture foveated images in accordance with an embodiment of the present invention.

Illustrative steps involved in using an imaging system that includes an image sensor such as sensor 14 of FIG. 4 are shown in FIG. 5. The process of FIG. 5 may include capturing one or more images using an imaging sensor with fixed foveation capabilities.

In step 82, camera sensor 14 may capture image data for one or more low interest regions of a scene. For example, camera sensor 14 may collect incident light with pixels 28 in region 70C of FIG. 4 and read out image data corresponding to the incident light from the pixels 28 in region 70C. The example of FIG. 4, in which low-interest regions 70C are formed in a peripheral ring of sensor 14, is merely an illustrative example. In general, low interest regions may be formed in any desired portion of sensor 14. The image data captured in step 82 may be relatively low resolution. Alternatively or in addition, when capturing video, the image data captured in step 82 may be captured at a relatively slow framerate (including, but not limited to, a zero framerate with a single static image of region 70C).

In step 84, camera sensor 14 may capture image data for one or more high interest regions of a scene. For example, camera sensor 14 may collect incident light with pixels 28 in region 70A of FIG. 4 and read out image data corresponding to the incident light from the pixels 28 in region 70C. The example of FIG. 4, in which high-interest region 70A is formed in the center of sensor 14, is merely an illustrative example. Placing high-interest region 70A in the center of sensor 14 allows a user of device 10 to quickly capture objects of interest to the user with high quality in a foveated image, simply by aiming camera module 12 such that the objects of interest are located within the center region of the image. In general, high interest regions may be formed in any desired portion of sensor 14. The image data captured in step 84 may be relatively high resolution (e.g., higher resolution than the image data captured in step 82 and optional step 83). Alternatively or in addition, when capturing video, the image data captured in step 84 may be captured at a relatively fast framerate. Loop 85 illustrates that, when capturing video, step 84 may be repeated. Loop 85 also illustrates that, in at least some arrangements, image sensor 14 may capture multiple images using high-interest region 70A that are combined into a single frame or image (e.g., multiple "captures" may be averaged together to form a single image or a single frame, in order to further improve the quality of image data for high-interest region 70A).

In optional step 83, camera sensor may capture image data for one or more moderate-interest regions of a scene (e.g., regions such as region 70B of FIG. 4). There may be any desired number of gradations in quality (e.g., interest level, resolution, framerate, etc.) between the low-interest regions captured in step 82 and the high-interest regions captured in step 84 (this possibility is illustrated by the ellipsis between steps 83 and 84). In at least some arrangements, these moderate-interest regions may smooth transitions between high-interest regions of a foveated image, captured at a high quality, and low-interest regions, captured at a low quality, thereby masking (e.g., softening) the transitions between high and low-interest regions. The image data captured in step 83 may be captured at a quality (e.g., resolution and/or framerate) between the quality of image data captured in steps 82 and 84.

In step 86, the image data captured in step 82, optional step 83, and step 84 may be combined by image processing circuitry, such as circuitry 16 and 24 of FIG. 1, to form one or more foveated images of the scene. When forming multiple foveated images of the scene, step 86 may include forming video with foveated frames (i.e., foveated video).

With one suitable arrangement, step 86 may include forming foveated video in which high-interest regions are captured and displayed with a relatively high quality (e.g., a relatively high framerate and/or resolution) and moderate and low-interest regions are captured with displayed with a lower quality (e.g., a relatively moderate or low, respectively, framerate and/or resolution). If desired, step 86 may include forming foveated video in which low-interest regions are static (e.g., have a near zero or zero framerate) and high-interest regions are captured and displayed at a high frame rate.

Figure 6:
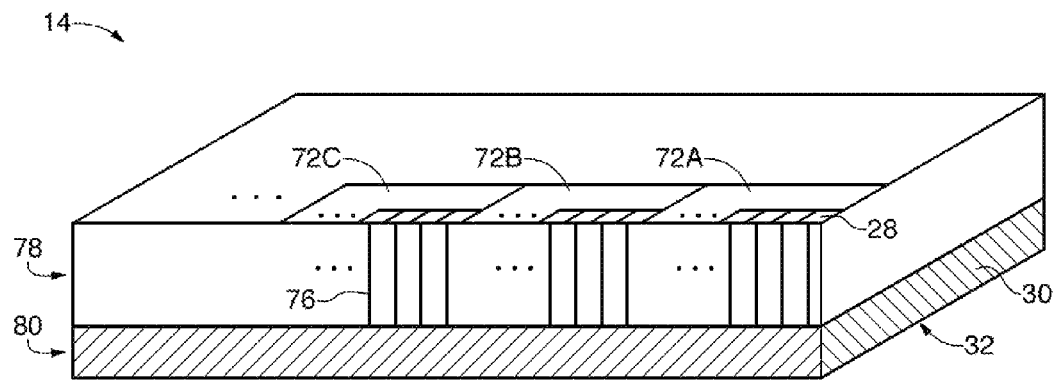
FIG. 6 is a diagram of an illustrative array of imaging pixels that may have dynamically-determined foveated regions and that may be operable to capture foveated images in accordance with an embodiment of the present invention.

If desired, array 14 may include regions that are dynamically-reconfigurable to operate at different resolutions and/or frame rates at different periods in time. An arrangement of this type is shown in FIG. 6. As shown in FIG. 6, array 14 may be separated into two or more regions such as regions 72A, 72B, and 72C. These regions of array 14 may be arranged, as an example, in a grid-like pattern. Each of these regions may include any suitable number of pixels 28.

With one suitable arrangement, camera module 12 may include circuitry such as address generator circuitry 32 that generates control signals that dynamically and independently adjust the resolution and/or frame rate of each of the regions of array 14 such as regions 72A, 72B, and 72C. For example, camera module 12 may include circuitry such as circuitry 15 that analyzes one or more previously-captured images and detects objects of interest within those images. Camera module 12 may then be dynamically reconfigured to capture one or more foveated images in which the objects of interest are captured with relatively high frame rates and/or resolutions.

Consider an example in which camera module 12 detects an object of interest in a region of a previous image corresponding to region 72A of FIG. 6, but does not detect any objects of interest in the regions of the previous image corresponding to regions 72B and 72C. In this example, circuitry 32 may assert control signals, such as binning control signals BIN, that configure the pixels of regions 72B and 72C to be binned together, thereby reducing the resolution of regions 72B and 72C, and may de-assert binning control signals for region 72A, thereby directing region 72A to operate at its full or native resolution. Alternatively or in addition, circuitry 32 may provide transfer, reset, and row select signals at a higher frequency (e.g., framerate) to region 72A than to regions 72B and 72C, such that video from region 72A is produced at a higher framerate than video from regions 72B and 72C.

As shown in FIG. 6, array 14 and image readout circuitry 30 may be formed from two or more stacked integrated circuit die. For example, array 14 may be formed from and in a first die 78, while image readout circuitry and, if desired, address generator circuitry 32 are formed in a second die 80. Circuitry in the dies 78 and 80 may be connected together using through silicon vias 76, as an example. Vias 76 may be used in forming paths such as paths 34 and 40 of FIG. 2 between pixels 28 and circuitry 30 and 32. Stacked die arrangements such as these may dramatically increase the number of available paths, such as paths 34 and 40, between array 14 and address generator circuitry 32 and image readout circuitry 42. If desired, stacked die arrangements may facilitate the direct connection of each pixel 28 in a particular region 72 of array 14, or of relatively small groups of pixels 28 in each region 72 of array 14, to image readout circuitry 30 and address generator circuitry 32. Such connections may facilitate image readout operations and pixel control operations (e.g., reset, transfer, and select for output operations) for independent regions of array 14. In particular, such connections may facilitate configuration a first region 72A to operate at a different resolution and/or frame rate than an adjacent region 72B (e.g., may allow regions 72 to operate as independent image sensor arrays).

Figure 7:
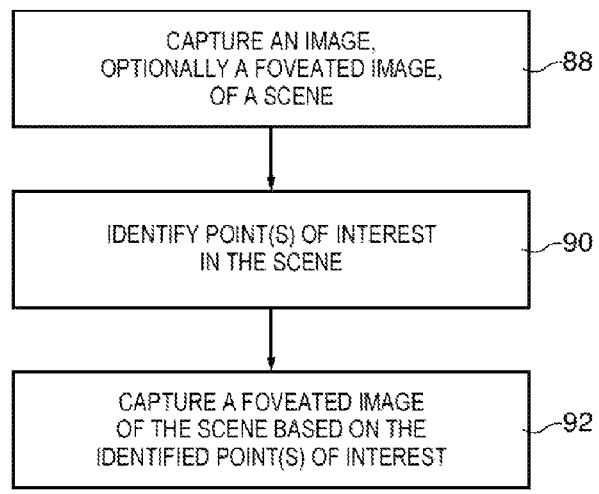
FIG. 7 is a flow chart of illustrative steps involved in using an imaging system with dynamically-determined foveated regions to capture foveated images in accordance with an embodiment of the present invention.

Illustrative steps involved in using an imaging system with dynamically-reconfigurable foveation capabilities, such as array 14 of FIG. 6, are shown in FIG. 7. The process of FIG. 7 may include capturing one or more images and capturing video using an image sensor with dynamically-determined foveated regions (e.g., images in which the regions captured at high quality, corresponding to objects of interest in a scene, may shift over time).

In step 88, camera module 12 may use camera sensor 14 to capture an image of a scene. If desired, the image captured in step 88 may be a non-foveated image in which all regions of the image are captured with a common resolution and framerate. With other suitable arrangements, the image captured in step 88 may be a foveated image in which objects of interest are captured with a high level of detail (such as an image captured in step 92 of a previous iteration of the steps of FIG. 7).

In step 90, image processing circuitry, such as circuitry 15 in camera module 12 and circuitry 24 in host subsystem 20, may analyze the image captured in step 90 and may identify one or more points (e.g., objects) of interest in the image. For example, circuitry 15 may analyze the image captured in step 90 to detect faces in the image. With another suitable arrangement, step 88 may include capturing two or more images and step 90 may include analyzing the two or more images to detect objects in motion in the scene. Any desired objects, such as faces, moving objects, entire persons, etc., may be identified as objects of high interest. When step 90 involves analyzing a foveated image, the identified objects of interest may lie within portions of the foveated image that are represented with a high, a moderate, or a low level of detail.

In step 92, camera module 12 may be dynamically reconfigured to capture a foveated image in which regions of array 14 that image locations identified to contain objects of interest (in step 90) are configured to capture a high level of detail of those locations. Camera module 12 may be dynamically configured to capture the foveated image such that regions of array 14 that image locations devoid of objects of interest (e.g., regions in which no objects of interest were detected in step 90) are configured to capture a low level of detail. Camera module 12 may be configured such that regions that are devoice of objects of interest, but that are adjacent to another region that contains an object of interest, are captured with an intermediate level of detail. Various regions of camera module 12 may be dynamically configured to capture either a high level of detail, a low level of detail, or some intermediate level of detail. With some suitable arrangements, each region of camera module 12 may be configured to capture image data at a level of detail that varies as a function (e.g., proportional to) of the distance between the center of that region and the nearest detected object of interest. Each region, such as one of regions 72A, 72B, and 72C of FIG. 6, may be configured using control signals such as binning control signals.

Figure 8:
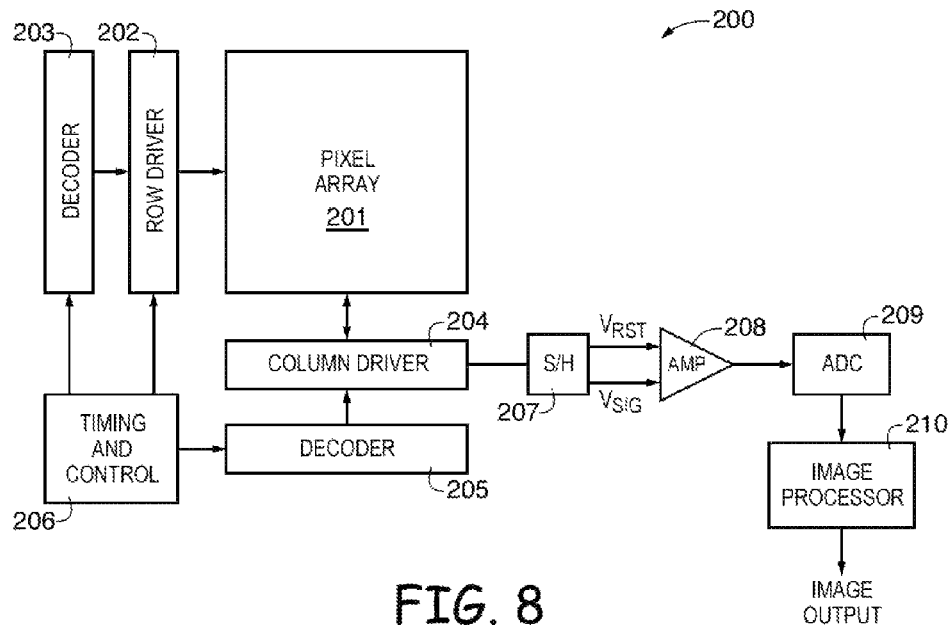
FIG. 8 is a block diagram of an imager employing one of the embodiments of FIG. 4 or FIG. 6 in accordance with an embodiment of the present invention.

FIG. 8 illustrates a simplified block diagram of imager 200 (e.g., a CMOS imager having foveated imaging capabilities as described herein). Pixel array 201 includes a plurality of pixels containing respective photosensors arranged in a predetermined number of columns and rows. The row lines are selectively activated by row driver 202 in response to row address decoder 203 and the column select lines are selectively activated by column driver 204 in response to column address decoder 205. Thus, a row and column address is provided for each pixel.

CMOS imager 200 is operated by a timing and control circuit 206, which controls decoders 203, 205 for selecting the appropriate row and column lines for pixel readout, and row and column driver circuitry 202, 204, which apply driving voltages to the drive transistors of the selected row and column lines. The pixel signals, which typically include a pixel reset signal Vrst and a pixel image signal Vsig for each pixel are sampled by sample and hold circuitry 207 associated with the column driver 204. A differential signal Vrst-Vsig is produced for each pixel, which is amplified by amplifier 208 and digitized by analog-to-digital converter 209. The analog to digital converter 209 converts the analog pixel signals to digital signals, which are fed to image processor 210 which forms a digital image.

Figure 9:
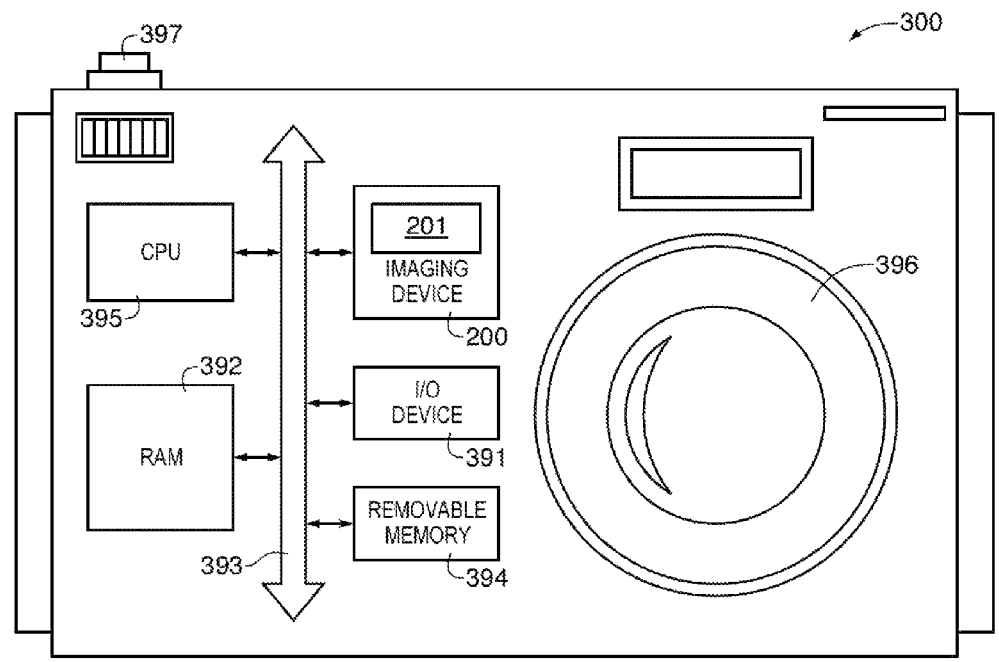
FIG. 9 is a block diagram of a processor system employing the imager of FIG. 8 in accordance with an embodiment of the present invention.

FIG. 9 shows in simplified form a typical processor system 300, such as a digital camera, which includes an imaging device such as imaging device 200 (e.g., an imaging device 200 such as imaging device 14 of FIGS. 4 and 6 employing a pixel array having foveated imaging capabilities). Processor system 300 is exemplary of a system having digital circuits that could include imaging device 200. Without being limiting, such a system could include a computer system, still or video camera system, scanner, machine vision, vehicle navigation, video phone, surveillance system, auto focus system, star tracker system, motion detection system, image stabilization system, and other systems employing an imaging device.

Processor system 300, which may be a digital still or video camera system, may include a lens such as lens 396 for focusing an image onto a pixel array such as pixel array 201 when shutter release button 397 is pressed. Processor system 300 may include a central processing unit such as central processing unit (CPU) 395. CPU 395 may be a microprocessor that controls camera functions and one or more image flow functions and communicates with one or more input/output (I/O) devices 391 over a bus such as bus 393. Imaging device 200 may also communicate with CPU 395 over bus 393. System 300 may include random access memory (RAM) 392 and removable memory 394. Removable memory 394 may include flash memory that communicates with CPU 395 over bus 393. Imaging device 200 may be combined with CPU 395, with or without memory storage, on a single integrated circuit or on a different chip. Although bus 393 is illustrated as a single bus, it may be one or more buses or bridges or other communication paths used to interconnect the system components.

Various embodiments have been described illustrating imaging systems that may include a camera sensor with foveated imaging capabilities.

A camera sensor may be hardwired to capture foveated images with a fixed foveation pattern. As one example, the camera sensor may be hardwired to capture a center region of each image at a higher level of detail and to capture peripheral regions of each image at one or more lower levels of detail. With one suitable arrangement, the camera sensor may capture a foveated image at least with a center region at a first resolution and peripheral regions at a second and lower resolution.

A camera sensor may be dynamically-reconfigurable to capture non-foveated images or foveated images with selected regions at different quality levels. As examples, the camera sensor may be able to capture non-foveated images with a uniform quality level across the images or foveated images with quality levels that vary across the images. The camera sensor may be able to identify objects of interest in captured photos. The camera sensor may then be able to adjust its foveation pattern such that subsequent foveated images have high quality regions that image the identified objects of interest and have low quality regions imaging areas devoid of objects of interest.

The foregoing is merely illustrative of the principles of this invention and various modifications can be made by those skilled in the art without departing from the scope and spirit of the invention. The foregoing embodiments may be implemented individually or in any combination.

What is claimed is:
1. A system, comprising:
a central processing unit;
memory;
input-output circuitry; and
an imaging device, wherein the imaging device comprises:
an array of image sensing pixels divided into at least first and second regions, wherein each image sensing pixel comprises a photosensitive element;

a transistor connected to each of the photosensitive elements in a given pair of image sensing pixels;

address generator circuitry coupled to the array of image sensing pixels; and image readout circuitry coupled to the array of image sensing pixels, wherein the image readout circuitry is operable to readout image data from the first region of the array at a first resolution and is operable to readout image data from the second region of the array at a second resolution, wherein the first resolution is greater than the second resolution, and wherein the first and second resolutions are based on control signals from the address generator circuitry applied to the transistor.

2. The system defined in claim 1 wherein the image sensing pixels of the array are formed in a uniform density across the array.

3. The system defined in claim 2 wherein the array of image sensing pixels comprises conductive paths between pairs of image sensing pixels in the second region of the array, wherein each conductive path is operable to bin together one of the pairs of image sensing pixels in the second region of the array, and wherein the image sensing pixels in the first region of the array are not binned together.

4. The system defined in claim 1 wherein the image sensing pixels in the first region of the array are formed in a first density, wherein the image sensing pixels in the second region of the array are formed in a second density, and wherein the first density is greater than the second density.

5. The system defined in claim 1 wherein the image readout circuitry is operable to readout image data from first region at the first resolution and from the second region at the second resolution as part of capturing a first image and wherein, as part of capturing a second image, the image readout circuitry is operable to readout image data from the first region at the second resolution and is operable to readout image data from the second region at the first resolution.

6. The system defined in claim 5 wherein the image sensing pixels of the array are formed in a uniform density across the array.

7. The system defined in claim 1 wherein the imaging device further comprises image processing circuitry operable to generate a foveated image by combining the image data from the first and second regions of the array.

8. A method of using an image sensor that includes first and second pluralities of image sensing pixels and address generator circuitry coupled to the first and second pluralities of image sensing pixels, wherein each image sensing pixel comprises a photosensitive element, and wherein a transistor is connected to each of the photosensitive elements in a given pair of image sensing pixels, the method comprising:

capturing a first image portion at a first resolution using the first plurality of image sensing pixels;

capturing a second image portion at a second resolution using the second plurality of image sensing pixels, wherein the first resolution is greater than the second resolution and wherein the first and second resolutions are based on control signals from the address generator circuitry applied to the transistor; and combining the first and second image portions into a foveated image.

9. The method defined in claim 8 wherein the first plurality of image sensing pixels are spread across the image sensor in a first density, wherein the second plurality of image sensing pixels are spread across the image sensor in a second density, and wherein the first density is greater than the second density.

10. The method defined in claim 8 wherein the first and second pluralities of image sensing pixels are spread across the image sensor in a common density and wherein capturing the second image portion at the second resolution comprises binning together pixel charges from at least some of the image sensing pixels in the second plurality of image sensing pixels.

11. The method defined in claim 8 further comprising:

capturing a third image portion at a given resolution using the first plurality of image sensing pixels;

capturing a fourth image portion at the given resolution using the second plurality of image sensing pixels; and combining the third and fourth image portions into a non-foveated image having a constant resolution across the non-foveated image.

12. The method defined in claim 8 further comprising:

capturing a third image portion at the second resolution using the first plurality of image sensing pixels;

capturing a fourth image portion at the first resolution using the second plurality of image sensing pixels; and combining the third and fourth image portions into an additional foveated image.

13. A method comprising:

using an image sensor comprising a plurality of image sensing pixels and address generator circuitry coupled to the plurality of image sensing pixels, wherein each image sensing pixel comprises a photosensitive element, and wherein a transistor is connected to each of the photosensitive elements in a given pair of image sensing pixels, capturing an image of a scene;

using image processing circuitry and the image, identifying at least a first point of interest in a first region of the scene; and configuring the image sensor to capture a foveated image in which the first region of the scene is captured at a first resolution and in which at least a second region of the scene is captured at a second resolution that is less than the first resolution, and wherein the first and second resolutions are based on control signals from the address generator circuitry applied to the transistor.

14. The method defined in claim 13 wherein configuring the image sensor to capture the foveated image comprises applying binning control signals to image sensing pixels that are associated with the second region of the scene.

15. The method defined in claim 13 wherein the foveated image is one of a plurality of foveated images in a video stream, the method further comprising:

creating the video stream of foveated images using the image sensor and the image processing circuitry.

16. The method defined in claim 15 wherein creating the video stream of foveated images comprises:

capturing a given frame that includes the second region of the scene;

capturing a plurality of additional frames that each include the first region of the scene; and forming each of the plurality of foveated images by combining the given frame with a respective one of the additional frames.

17. The method defined in claim 13 wherein identifying the first point of interest in the first region comprises detecting a face in the image.

18. The method defined in claim 13 wherein the first point of interest in the first region of the scene comprises an object of interest in the first region of the scene, the method further comprising:

using the image processing circuitry and the foveated image, determining that the object of interest has moved into the second region of the foveated image;

reconfiguring the image sensor to capture an additional foveated image in which the second region of the scene is captured at the first resolution and in which at least the first region of the scene is captured at the second resolution.

* * * * *